US007226621B2

(12) United States Patent
Wolmeister

(10) Patent No.: US 7,226,621 B2
(45) Date of Patent: Jun. 5, 2007

(54) FORMULATION AND PROCESS FOR MAKING FORMULATION FOR PRESERVATION OF ANIMAL AND VEGETABLE TISSUES

(75) Inventor: Walter Luiz Wolmeister, Nova Petropolis (BR)

(73) Assignee: Annes Participacoes, Portao RS (BR)

( * ) Notice: Subject to any disclaimer, the term of this patent is extended or adjusted under 35 U.S.C. 154(b) by 167 days.

(21) Appl. No.: 11/031,193

(22) Filed: Jan. 7, 2005

(65) Prior Publication Data

US 2005/0120489 A1 Jun. 9, 2005

Related U.S. Application Data

(63) Continuation-in-part of application No. 10/208,516, filed on Jul. 29, 2002, now abandoned.

(51) Int. Cl.

| | |
|---|---|
| ***A01N 59/08*** | (2006.01) |
| ***A01N 55/02*** | (2006.01) |
| ***A01N 59/16*** | (2006.01) |
| ***C14C 3/06*** | (2006.01) |

(52) U.S. Cl. .................... 424/655; 8/94.19 R; 8/94.27; 424/656; 514/505

(58) Field of Classification Search ................ 514/505; 424/655, 656; 8/94.19 R, 94.27
See application file for complete search history.

(56) References Cited

U.S. PATENT DOCUMENTS

| | | | | |
|---|---|---|---|---|
| 4,750,906 | A * | 6/1988 | Schmidt | 8/94.27 |
| 4,875,900 | A | 10/1989 | Singh et al. | 8/94.27 |
| 5,725,599 | A | 3/1998 | Danner et al. | 8/94.21 |
| 6,663,676 | B1 * | 12/2003 | El A'mma et al. | 8/94.1 R |

FOREIGN PATENT DOCUMENTS

| | | |
|---|---|---|
| GB | 1598709 | 9/1981 |

* cited by examiner

*Primary Examiner*—Johann Richter
*Assistant Examiner*—Ernst Arnold
(74) *Attorney, Agent, or Firm*—Clifford Kraft

(57) ABSTRACT

A formulation and process for making a formulation for leather tanning using highly complexed Chrome III salts coupled with polymer complexing agents of medium and low molecular weight in the range of 500 to 10,000. Complexing polymers can contain vinylic acid/ester co-polymers, polyamine/polyamide co-polymers and polymers condensed from saturated carbon linked aromatic groups based on phenol and naphthalene sulfonates or other aromatic rings.

3 Claims, 1 Drawing Sheet

FORMULATION AND PROCESS FOR MAKING FORMULATION FOR PRESERVATION OF ANIMAL AND VEGETABLE TISSUES

This application is a Continuation-In-Part of, and claims priority from, application Ser. No. 10/208,516 filed Jul. 29, 2002, now abandoned, which application is hereby incorporated by reference.

BACKGROUND

1. Field of the Invention

The present invention relates generally to the field of leather tanning and more particularly to a formulation and process using chromium III salts with polymer complexing agents to tan leather.

2. Description of the Prior Art

The tanning of animal hides using various chemicals to produce leather and other products is known in the art. Animal hides must be treated in order to preserve them from decay since they contain a high content of degradable protein, as well as water and other matter. To prevent decay, hides are subjected to various treatments.

The hides are usually first subjected to processes such as liming, de-liming, bating and pickling. In addition, an oxidation step can be employed for whitening the hides using agents like sodium chlorite (or other bleaching agents). Pickling is done using mineral salts like sodium chloride in sulphuric acid and possibly formic acid.

The actual tanning step consists of treatment by ether vegetable extracts or mineral tanning agents. One very common type of mineral salt tanning is to subject the hide to a treatment employing a chromium III sulfate or chloride which, under acidic conditions, penetrates into the leather structure. The chromium salts form a complex with the carboxyl groups of protein during the subsequent step of basification. Chrome treatment is known to impart superior chemical and physical properties to the leather than tanning with vegetable agents.

The tanning process normally consists of the steps of treating the hide with chromium salts, basification where cross-linking of the chromium with the carboxyl group of the collagen occurs, re-chroming where with more chromium salts to improve chromium fixation and re-basification. The product is than neutralized to PH 4.5–5.6 to make it ready for the dyeing and other processes. Chrome tannage involves a cross-linking reaction between carboxyl groups of the collagen molecules and the chromium III salt. The carboxyl groups, when ionized, are attracted to the chromium III tanning complex, and a reaction takes place. The following diagram shows a possible structure for the chrome/hydroxyl/sulfate complex.

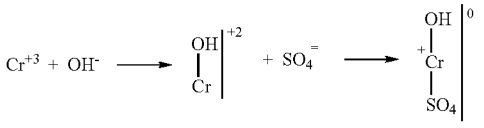

Chromium III Hydroxyl and Sulfate Complex

U.S. Pat. No. 4,875,900 by Singh et al. further describes this process. There appear to be several reactions taking place. The first reaction is between the chromium III (+3) ion and hydroxyls OH (−1) forming a +2 cation, reaction of this cation with sulfate (−2) ions to form neutral OH—Cr—$SO_4$ complex, reaction of this complex with masking agents (such as formate) and further reaction with the hide protein causing the (Formate-Cr—OH)— to link to the hide. U.S. Pat. No. 4,875,900 is hereby incorporated by reference. Singh et al. further teach the use of aqueous dispersions of polyamides and polyesters, where the use of polymers have been found to improve the properties of the resulting leather. In particular, it has been found that various Nylons (polyamides), copolymers and terpolymers containing mixed diamines and dibasic acids or lactums can be utilized. Also polyester waste, and the like, can be used.

U.S. Pat. No. 5,725,599 by Danner et al. teaches the use of polymeric carboxylic acids containing a-hydroxyacrylic acid units as well as other anionic co-monomeric units in free acid form such as derivatives of ethylenically unsaturated monomeric carboxylic acids (principally of aliphatic C3–5-carboxylic acids such as (meth)acrylic acid, crotonic acid, maleic acid, itaconic acid, aconitic acid and citaconic acid, among which meleic acid and (meth)acrylic acid are preferred, especially acrylic acid. Danner et al. also teach non-ionic monomeric units from derivatives of (meth)acrylamide, (meth)acrylonitrile and/or vinylmethylether. Danner et al. use polymetric carboxylic acids with numerical average molecular weight in the range of 500 to 100,000, with 600 to 30,000 being preferable. They use polymers with numerical average molecular weight in the range of 1000 to 500,000 with 1000 to 250,000 being preferred. U.S. Pat. No. 5,725,599 is hereby incorporated by reference.

SUMMARY OF THE INVENTION

The present invention relates to a formulation and process for tanning that uses highly complexed chromium III salts linked to polymers of low to medium average molecular weights in the range from 500 to 10,000. Some of these polymers can contain:

I—Vinylic acid based copolymers, such as acrylic acid, methacrylic acid, fumaric acid, maleic anhydirde; and vinylic esters, such as ethyl acrylate, butyl acrylate, 2-ethylhexyl acrylate, 2-hydroxiproply acrylate and vinyl acetate.

II—Polymers with aromatic rings based on sulfonated phenol and/or naththalene or other ring compounds condensed with formaldehyde, such for example, those provided by Bayer AG under trade names such as TANIGAN LT, TANIGAN OS and TANIGAN PR.

III—Condensed copolymers that are polyamine and polyamide-based, synthesized from acrylonitrile, acrylamide, n-methylacrylamide copolymerization and further condensed with urea, formaldehyde, melamine and/or dicyandiamide.

Principal Advantages of the Formulation of the Present Invention

1. High Crossing-through Speed

Due to the low basicity, the chrome penetrates in a fast and uniform form in the different areas of the hide, providing faster tanning than the processes with traditional chrome salts, the pickle step can be left out, and the tanning process can be shortened from 6 to 8 hours.

2. Excellent Chrome Absorption

This property can be observed through the excellent exhaustion of chrome residual from residual floats and the higher content of chrome fixed on leathers. In addition, the chrome distribution in layers is optimized. The graph of FIG. 1 shows the comparison between two tannings, one with 6% traditional chrome basic sulfate (with a concentration of 26% $Cr_2O_3$), and the other with 9.5% of the proposed formulation (with concentration of 15% $Cr_2O_3$).

It is observed that even with a smaller percentage of chrome oxide (in the example case, 1.56% $Cr_2O_3$ for the traditional formulation, and 1.42% $Cr_2O_3$ for the proposed formulation), the fixed chrome content is higher, being in average 3.56% $Cr_2O_3$ for the traditional, and 4.07 $Cr_2O_3$ for the developed formulation. This positive effect of the product allows the total chrome percentage to be decreased, without loss on the chrome absorption by the hide.

Characteristics of Leather Made with the Formulation of the Present Invention

Leathers tanned with the tanning formulation of the present invention show in semi-finished form, a firm and fine grain, due to the low reactivity during the first steps of tannage. Other positive effects observed were in relation to the filling and uniformity.

Other retannings were made, including of soft leathers, such as apparel and footwear nappa. Some advantages, such as greater softness and filling, were also observed.

Process Versatility

The formulation of the present invention can be used in different forms in the tanning process of leathers. An example of a process where the formulation provides the highest advantages is so-called "Tanning Direct Process".

In this process, the formulation of the present invention is added after the de-liming step eliminating the conventional pickle and the basification processes. Chrome penetrates in the final de-liming conditions, and the hide alkalinity itself is responsible for the basification. This results in saving products and in eliminating hazardous and toxic products from the industrial environment (such as sulphuric acid and formic acid), as well as ease of the process control.

It is also possible, in accordance to the needs of each tannery, to perform a brief salt-acid treatment before adding the formulation of the present invention, or even combining it with the traditional formulations. In this case, the process advantages are proportional to the amount of the proposed formulation used.

Characterization of the Tanning Formulation of the Present Invention

Active ingredients: highly complexed chrome III salts.

Complexing agents: polymers of medium and low molecular weight (in the range of 500 to 10,000 units of atomic mass), with bridged aromatic rings of 6 and 10 carbon atoms based on sulfonated phenols and/or naphthalene or other aromatics. The bridges coupling the aromatic units are saturated aliphatic chains having hydroxyl (OH), amine (—NH2), carboxyl (—COOH), sulphonic (—$SO_3H$) and other possible functional groups.

Formulation of the Solution: The chrome III aqueous solution reacts with specific complexing copolymers in acid medium at a temperature between 40 and 60° C., forming the product that is object of this invention, an acid aqueous solution with $Cr_2O_3$ content from 12 to 18% and basicity from 10 to 20%.

General Description of the Formulation of the Present Invention

ACTIVE: organic and inorganic salts of highly complexed Chrome III.

SOLVENT: water

PRODUCT IDENTITY: soluble in water, non-inflammable, non-volatile, corrosive.

DENSITY: between 1.35 and 1.70 g/ml.

PHYSICAL STATE: viscous liquid of dark green color.

pH IN 10% AQUEOUS SOLUTION: between 2.0 and 3.0.

$Cr_2O_3$ CONTENT: 12 TO 18%

BASICITY: 10 TO 20%

DETAILED DESCRIPTION OF THE INVENTION

Figure 1:
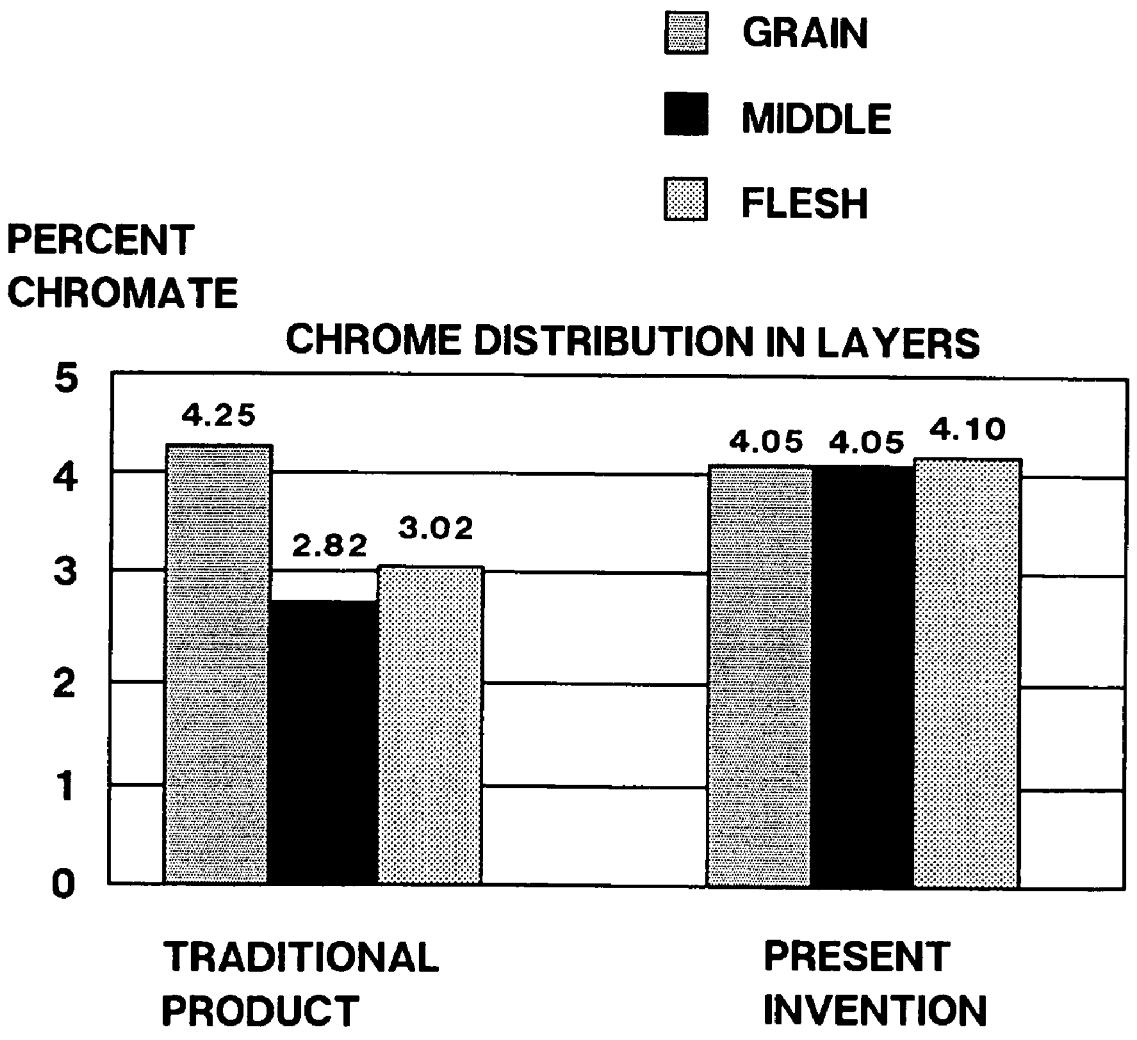
FIG. 1 shows the comparison between two tannings in the form of a graph.

The present invention relates to a formulation and process for making the formulation which is a highly complexed chromium III tanning solution. The first step is to produce a chrome-acid sulfate. The second step is to produce three different types of copolymers. The third step is to complex the polymers with the chrome III solution to form the tanning formulation. Specific examples are given; however, it will be understood by one skilled in the art that many variations are possible. All of these variations are within the scope of the present invention.

The three major steps of the process are:

A. Synthesis of the chrome III acid solution.

B. Synthesis of the complexing copolymers.

C. Synthesis of the final complexed chrome III tanning formula.

Several examples are now given to aid in a complete understanding of the present invention. In these examples, the term "parts" generally means parts by weight except where parts by volume is specified. The proportions given can be varied somewhat without changing the results.

A. Synthesis of the Chrome III Solution.

300 parts of sodium dichromate $Na_2Cr_2O_7$ (note: the potassium salt, or other similar chromium salt may be substituted) are added to 300 parts water in a reaction vessel equipped with a stirrer, thermometer, dosing vessel and a reflux condenser. Next, 260 parts of concentrated sulphuric acid are added, and the temperature is raised to between 60 and 70 degrees C. At that point, 200 parts of 40% saccharose solution (or other sugar) is added while controlling the temperature between 95 and 100 degrees C. A dark green acid-characteristic chrome III sulfate solution is obtained. The chrome III sulfate acid solution generally contains metal-sulfate complexes similar to (remembering that the complex exists in a highly acid aqueous solution):

Chrome III Acid Sulfate Complex$_1$

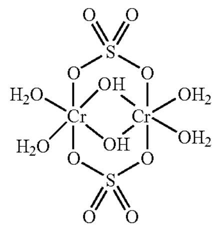

B. Synthesis of the Complexing Polymers

Three different types of complexing polymers (described as types I, II and III) are prepared or obtained:

I. Vinylic acid/ester based copolymers made from acrylic acid, methacrylic acid, fumaric acid, maleic anhydride, and vinyl esters such as ethyl acrylate, butyl acrylate, 2-ethylhexyl acrylate, 2-hydroxyproply acrylate, and vinyl acetate.

II. Linked polymers containing aromatic rings primarily based on phenol and napthalene sulfonic acids (or other aromatic rings). These are formaldehyde condensed polymers generally supplied commercially by companies like Bayer AG under the trade names such as TANIGAN LT, TANIGAN OS and TANIGAN PR. Their structure generally contains bridges of one or more saturated carbon atoms between the aromatics. The saturated bridge carbon(s) is(are) attached to the aromatic ring. The linking carbons can be saturated with —H, —OH, —$NH_2$, —COOH, —$SO_3$ and other groups. This type of polymer is shown with hydrogen saturated linking carbons below.

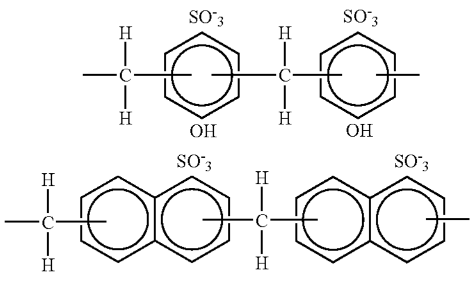

Polymers with Aromatic Rings Linked by Saturated Aliphatic Bridges

III. Condensed copolymers based on polyamines and polyamides synthesized from acrylonitrile, acrylamide, n-methylacrylamide and further condensed with urea, formaldehyde, melamine and/or dicyandiamide.

EXAMPLES OF CO-POLYMER SYNTHESIS

Examples will now be given for the preparation of each of the two non-commercial types of copolymers (Types I and II). One skilled in the art will realize that many variations are possible in these examples. In particular many different organic acids can be employed for the type I co-polymer with similar results.

Example 1

Type I Vinylic Acid/Ester based Co-Polymer 360 parts of water containing 0.02 parts of sodium metabisulfite and 0.01 part of ferrous sulfate are loaded into a 2 liter reaction flask equipped with a stirrer, thermometer, two dosing vessels (A) and (B) equipped with a cowles type stirrer and a reflux condenser. Dosing vessel (A) is loaded with 20 parts acrylic acid, 300 parts of butyl acrylate, 50 parts of vinyl acetate, 50 parts of 2-hydroxypropylacrilate and 30 parts of acrylamide which are emulsifed with 100 parts of water, 15 parts of a non-ionic surfactant such as, for example, Disponil A-1080 (Cognis), and 5 parts of an anionic surfactant such as, for example, Disponil 70B (Cognis). Dosing vessel (B) is loaded with a prepared solution of 1.5 parts of ammonium persulfate in 60 parts of water.

The dosing vessel (A) emulsion and the dosing vessel (B) solution are simultaneously added to the reaction flask slowly over a period of 4 hours maintaining the temperature around 72 to 77 degrees C. The mixture is maintained in this same temperature range for two additional hours and then cooled to room temperature to obtain around 1100 parts of the complexing co-polymer in the form of a white emulsion with about 35% total solids content, a pH of 3–4 (in 10% aqueous solution) and an average molecular weight of around 74,000 (measured by Gel Permeation Chromatography).

Example 2

Type I Vinylic Acid/Ester Based Co-Polymer (Alternate Formulation)

The procedure is like that of example 1 except that the following monomers are used: 30 parts of acrylic acid, 200 parts of butyl acrylate, 50 parts of vinyl acetate, 50 parts of 2-hydroxypropylacrylate, 70 parts of styrene, 50 parts of fumaric acid and 3 parts of ammonium persulfate. The final product is a white emulsion with around 35% total solids content and an average molecular weight of around 48,000.

Example 3

Type III Condensed Polyamines and Polyamides

A 2 liter reaction flask equipped with a stirrer, thermometer, reflux condenser and two dosing vessels (A) and (B) equipped with a Cowles type stirrer is loaded with 800 parts water, 1.5 parts sodium lauryl sulfate and 20 parts of a colloidal protector, such as, for example, Cellosize WP-09 manufactured by Union Carbide. The flask is heated to 80 degrees C+/−5 degrees. 10 parts of acrylic acid, 50 parts of vinyl acetate and 300 parts of acrylamide which are emulsified with 150 parts of water and 10 parts of sodium sulfate are loaded into vessel (A). A solution of 2.5 parts of ammonium persulfate in 50 parts of water is loaded into vessel (B). The dosing vessel (A) emulsion and the dosing vessel (B) solution are simultaneously added to the reaction flask over a period of 5 hours maintaining the temperature at around between 80 and 85 degrees C. The mixture is maintained around the same temperature for 2 more hours and then allowed to cool to 30–40 degrees C. 5 parts of urea, 15 parts by volume of 30% formaldehyde and 5 parts of melamine are added, and the flask is re-heated to between 80 and 85 degrees C. again. This temperature is maintained for around 2 hours. 20 parts of 10% sodium metabisulfite solution are then added, and the mixture is maintained for around another hour at between 80 and 85 degrees C. The mixture is then cooled to room temperature, and around 1400 parts of the complexing copolymer are obtained as a white emulsion with around 15–18% total solids content, pH of around 4–5 (in 10% aqueous solution), and a viscosity of around from 300 to 500 cPs.

Example 4

Type III Condensed Polyamines and Polyamides (Alternate Formulation)

The procedure is like that of example 3 except the following reagents are used: In the co-polymerization: 10 parts acrylic acid, 50 parts vinyl acetate and 300 parts n-methylacrylamide; in the condensation: 5 parts urea, 10 parts by volume 30% formaldehyde, 3 parts dicandiamide and 20 parts 10% sodium metabisulfite. The condensed copolymer contains around 16–18% total solids, has a pH of around 4–5 (in 10% aqueous solution) and a viscosity of from around 600 to 1000 cPs.

C. Synthesis of the Complexed Chrome III Tanning Formulation

Generally, the chrome III aqueous solution prepared in step A is heated to a temperature of from about 40–60 degrees C. in a vitrified reactor equipped with a stirrer, thermometer, pressure indicator, pH indicator, reflux condenser, and entry ports from dosing vessels provided with flux measuring devices. Into this Chrome III solution are added through the dosing vessels the complexing co-polymers of types I, II and III previously described in amounts from about 1% to about 10% over the total weight of the chrome III solution. The exact percentage is not critical within this range and can be chosen to control the physical properties of the final product. The type I and III copolymers can be chosen from the examples given, or other variations on their composition can be used. The reaction mixture is generally maintained at a temperature between about 40 and 60 degrees C. for from around 2 to 4 hours, and then cooled to room temperature. The final product is standardized to a density between 1.35 to 1.70 g/ml, a basicity of between 10% and 20%, and a pH of between 2–3 (in 10% aqueous solution) by the addition of acid salts such as sodium acid lactate, sodium acid citrate, sodium acid tartrate to control pH and basicity, and sodium salicylate in amounts of 0.1 to 1.0% to control density.

It should be noted, that the Type II condensed polymers (TANIGAN LT, TANIGAN OS and TANIGAN PR and other similar commercial products) are similar in physical properties and may be interchanged. The naphthalene sulfonate-based polymers are heavier than the phenol sulfonate-based polymers on a volume basis and may result in a higher molecular weight final product.

Specific Example of the Final Formulation 500 parts of the Chrome III aqueous solution prepared in step A are put into the reactor described in the preceding paragraph and heated to around 50–60 degrees C. After 1 hour at this temperature, 25 parts of the Type I, Example 1 vinylic acid/ester copolymer and 10 parts of the Type II, Example 3 condensed polyamine and polyamide copolymer are added over the period of one hour while maintaining about the same temperature. The mixture is left at around this temperature for an additional hour, and then 25 parts of the type II aromatic copolymers (based on linked phenol or naphthalene sulfonates) are added over an hour while maintaining about the same temperature. The mixture is left at this temperature for an additional hour and then cooled to room temperature. The mixture is standardized to a density of around 1.35 to 1.70 g/ml, basicity 10 to 20%, pH of 2–3 (10% aqueous solution) using the methods described in the preceding paragraph (using acid salts and sodium salicylate). The chrome III sulfate acid solution generally contains metal-sulfate complexes that can be represented schematically like:

Complexed Chrome III Acid Solution

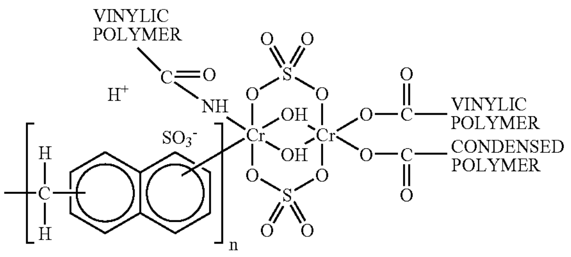

It can be seen that the Cr atoms form bonds with sulfate groups, hydroxyl groups and looser bonds with $OH_2$ groups (the bonding in this case being primarily between the chromium atom and the oxygen atom). The sites of the Cr—$OH_2$ bonding are weaker than the other bonds, and so the $H_2$ can be replaced by polymer complexing chains. Several possibilities arise: bonding between the oxygen and a position on the ring on a naphthalene sulfonic acid (or phenol based sulfonic acid) based polymer chain (such as in TANIGAN products); an amide bond to a vinylic polymer chain or an ester-like bond to a vinylic or condensed copolymer chain.

Application of the Tanning Formulation

Parallel tanning of bovine hides was performed with different process conditions comparing the proposed product and process with the traditional tanning process (6% traditional chrome salt, 25% $Cr_2O_3$ and 33% basicity). In this tannage, the hide must obligatorily be previously prepared in pickel (saline process with sulphuric acid, formic acid and/or aqueous sodium formate) to reach the traditional tanning chrome salt penetration conditions. The following examples show application of the formulation of the present invention:

Example 1

Application of the Proposed Tanning Formulation in a Semi-Direct Process

In the semi-direct process, hides are treated only with salt and a part of the normally used acid with the purpose of just beginning the acidification. However, it is not necessary to wait for all the acidity to cross through the hide. After 1 hour in the acid addition, it is already possible to add the proposed formulation. After the period necessary for the product to cross the hide's substance a basification is made only for adjusting the process final pH between 3.50 and 3.80.

Example 2

Application of the Proposed Tanning Formulation in a Direct Process

In tanning with the formulation of the present invention, the previous saline-acid treatment does not need to be made (or a brief saline-acid step of minutes to an hour can be used based on a tannery's needs). The formulation can be added directly onto the bated hides, and the tanning immediately begins. After the time necessary for crossing through, it is not necessary to basify because the leathers obtained are at the tanning final pH between 3.50 and 3.80. Basification is caused by the natural alkalinity of the hide.

Integral bovine hides were treated with the following results shown in Table I. When compared to the traditional process, where we see the advantage of shorter processing periods which are reduced from 20 to 12 hours:

TABLE 1

Comparison of the tanning time (for integral hides).

| PROCESS | TRADITIONAL TANNAGE | PROPOSED TANNING FORMULATION PROCESS |
|---|---|---|
| Pickle | 5 hours | 0 |
| Tanning | 3 hours | 12 hours |
| Basifying | 12 hours | 0 |
| Total | 20 hours | 12 hours |

From the tanned leathers described in the application example 2, a retannage processe was performed for obtaining two leather articles, called semi-chrome and semi-finished, with the purpose of comparing physical-mechanical properties. Tables II and III show that the leather obtained with the formulation of the present invention possess better properties:

TABLE 2

Physical-mechanical results of semi-chrome (1.4–1.6 mm)

| | TRADITIONAL | PROPOSED |
|---|---|---|
| Tensile strength ($N/mm^2$) | 11.3 | 12.0 |
| Elongation (5) | 37.6 | 48.3 |
| Tearing resistance (N/mm) | 47.8 | 51.0 |
| Lastometer (mm) | 8.3 | 9.7 |

TABLE 3

Physical-mechanical results of crust (1.2–1.4 mm)

| | TRADITIONAL | PROPOSED |
|---|---|---|
| Tensile strength ($N/mm^2$) | 10.4 | 13.3 |
| Elongation (5) | 35.6 | 42.5 |
| Tearing resistance (N/mm) | 51.4 | 56.4 |
| Lastometer (mm) | 8.5 | 8.2 |

The leathers obtained using the formulation of the present invention were superior in chrome distribution in the various leather layers. FIG. 1 shows a comparison of chromium oxide distribution between the conventional tanning method and the use of the present invention. In particular there is an excellent exhaustion of chrome residual floats and a higher content of chrome fixation in the leathers. It should be noted that even with a smaller percentage of chromium oxide (for example, 1.56% of $Cr_2O3$ for Cromosal and 1.42% with the formulation of the present invention), the percentage of chrome fixed in the leather is higher (around 3.56% for Cromosal and 4.07% for the formulation of the present invention). Leathers tanned with the formulation of the present invention present firm fine grain in the crust. Advantages were also observed in the case of retannings including soft leathers such as for apparel and footwear.

Several descriptions, examples, illustrations and tables have been provided to better aid in the understanding of the present invention. One skilled in the art will recognize that many changes and variations are possible. In particular, different reagents in the same or similar classes may be substituted without changing the results. Also variations in the processes described are possible without changing the results. All such substitutions, changes and variations are within the scope of the present invention.

I claim:

1. A formulation for tanning made by the process comprising:

(a) adding sodium dichromate or potassium dichromate to water to provide an aqueous solution, to which solution is further added sulfuric acid to provide chromium III acid sulfate complex present in an acidic aqueous solution;

(b) providing a mixture of a first, second and third copolymers, wherein the first copolymer is a copolymer having a molecular weight between the range of 500 to 10,000, wherein the first copolymer is a vinyl acid/ester based copolymer, the vinyl acid or ester being selected from the group consisting of acrylic acid, methacrylic acid, fumaric acid, maleic anhydride, ethyl acrylate, butyl acrylate, 2-ethylhexyl acrylate, 2-hydroxypropyl acrylate and vinyl acetate;

the second copolymer is a copolymer having a molecular weight between the range of 500 to 10,000, wherein the second copolymer is a condensate of formaldehyde and aromatic sulfonic acid, the copolymer having a saturated carbon bridging the aromatic rings in the copolymer;

the third copolymer is a copolymer having a molecular weight between the range of 500 to 10,000, wherein the third copolymer is a condensate of acrylonitrile, acrylamide or N-methylacrylamide with an agent selected from the group consisting of urea, formaldehyde, melamine and dicyandiamide; and (c) adding the mixture of the first, second and third copolymers to the acidic aqueous solution from step (a) and heating to a temperature of about 40 to 60° C. for about 1.5 to 5 hours and then cooled to room temperature to a obtain a formulation for tanning; wherein the combined amount of the first copolymer, second copolymer and third copolymer is 1 to 10 wt % based on the weight of the acidic aqueous solution from step (a), and the formulation for tanning has a $Cr_2O_3$ content of 12 to 18% and a basicity of between 10% and 20%.

2. The formulation of claim 1, wherein said saturated carbon is saturated with a member selected from the group consisting of —H, —OH, —$NH_2$, —COOH and —$SO_3$.

3. A method for making a formulation for tanning comprising:

(a) adding sodium dichromate or potassium dichromate to water to provide an aqueous solution to which solution is further added sulfuric acid to provide chromium III acid sulfate complex present in an acidic aqueous solution;

(b) providing a mixture of a first, second and third copolymers, wherein the first copolymer is a copolymer having a molecular weight between the range of 500 to 10,000, wherein the first copolymer is a vinyl acid/ester based copolymer, the vinyl acid or ester being selected from the group consisting of acrylic acid, methacrylic acid, fumaric acid, maleic anhydride, ethyl acrylate, butyl acrylate, 2-ethylhexyl acrylate, 2-hydroxypropyl acrylate and vinyl acetate;

the second copolymer is a copolymer having a molecular weight between the range of 500 to 10,000, wherein the second copolymer is a condensate of formaldehyde and aromatic sulfonic acid, the copolymer having a saturated carbon bridging the aromatic rings in the copolymer;

the third copolymer is a copolymer having a molecular weight between the range of 500 to 10,000, wherein the third copolymer is a condensate of acrylonitrile, acrylamide or N-methylacrylamide with an agent selected from the group consisting of urea, formaldehyde, melamine and dicyandiamide; and (c) adding the mixture of the first, second and third copolymers to the acidic aqueous solution from step (a) and heating to a temperature of about 40 to 60° C. for about 1.5 to 5 hours and then cooled to room temperature to a obtain a formulation for tanning; wherein the combined amount of the first copolymer, second copolymer and third copolymer is 1 to 10 wt % based on the weight of the acidic aqueous solution from step (a), and the formulation for tanning has a $Cr_2O_3$ content of 12 to 18% and a basicity of between 10% and 20%.

* * * * *